Reissued Oct. 24, 1922.

Re. 15,474

UNITED STATES PATENT OFFICE.

MARIE BLOCH, OF NEW YORK, N. Y.

FOOD PRODUCT.

No Drawing. Original No. 1,355,731, dated October 12, 1920, Serial No. 318,953, filed August 21, 1919. Application for reissue filed August 17, 1922. Serial No. 582,554.

*To all whom it may concern:*

Be it known that I, MARIE BLOCH, a citizen of the United States, and a resident of the city of New York, borough of Richmond, in the county of Richmond and State of New York, have invented a new and Improved Food Product, of which the following is a full, clear, and exact description.

This invention relates to a composition of matter, and particularly to food products.

An object of the invention is to provide a palatable and nutritious food product made by combining two or more food ingredients to produce the new edible matter herein disclosed.

It is an object to produce a food product which in a manner takes the place of macaroni, noodles, or other similar food, which is healthful and nutritious, and which may be manufactured and sold in packages or bulk and then cooked by the consumer.

It is also a purpose to produce a food of high concentrated value in which a maximum food value is embodied within a comparatively small volume of the composition of matter.

With the above principal objects in view, together with other purposes, the invention has relation to the particular composition of ingredients as disclosed in the following specification and claims.

In order to produce my new food product under the plans of this invention, I may take a quantity of tomatoes and thoroughly mix eggs therein by suitable agitation or stirring of the mixture, but the eggs may be omitted. It is preferable to employ concentrated tomatoes or what is known as tomato paste, and fresh eggs or prepared eggs may be mixed with the tomatoes to form the composition.

In presenting a more detailed description of my invention, and explaining the preferable proportions to be employed in the manufacture of this food product, there is disclosed the following proportions, to wit:

| | |
|---|---|
| Concentrated tomatoes | 6 ounces. |
| Egg | 1 ounce. |
| Flour | 14 ounces. |

But the egg may be omitted as stated. The above proportions produce a food product having the desired properties and characteristics attributed thereto by the several elements used in the composition.

Enough flour is added to stiffen the composition to a thick consistency in order to roll, knead, or otherwise work the resulting composition. Any suitable grain product, but preferably flour, is used to give weight and consistency to the composition.

The above described composition of matter is next rolled out in thin sheets, or strips, or any other suitable form. The sheets or strips of edible material are then cut into smaller pieces or blocks suitable and convenient in size for marketing. The product is allowed to dry until the pieces are dry and crisp, and entirely free from moisture. Should it be desirable, a small quantity of water, milk or other suitable liquid, may be used to facilitate the mixing of the ingredients and to hasten the amalgamation thereof in order to obtain the best results. It is preferable to add the fluid to the tomatoes and then mix with the flour and knead. If eggs are used, they may be mixed with the tomatoes and fluid before the flour is added.

The result of the above practice produces a very nutritious and healthful food product. The food may have a reddish tint, and provides a dish having very appetizing odors and agreeable tastes.

The resulting food product is put up in appropriate form, such as cans, boxes, or other sealed containers, for marketing purposes.

Having disclosed my invention, what I desire to obtain and secure by Letters Patent is as follows:

1. A dry food product consisting of a mixture of tomato, flour and egg.

2. A food product consisting of about six ounces of concentrated tomatoes, one ounce of egg, and fourteen ounces of flour.

3. A dry food product consisting of a mixture of tomato and flour.

4. A dry food product consisting of a mixture of tomato and flour subdivided into pieces.

MARIE BLOCH.